March 2, 1965  R. MAYER  3,171,950
ELECTRICAL ROOM HEATER-VENTILATOR CONTROL ARRANGEMENTS
Filed June 30, 1960  3 Sheets-Sheet 1

| PROGRAM STAGE | SWITCHES | | | | |
|---|---|---|---|---|---|
| | 11 | 12 | 6 | 13 | 14 |
| IIk | − | − |   | + | + |
| Ik  | − | − |   | − | + |
| O   | − | − |   | − | − |
| Iw  | − | + |   | − | + |
| IIw | − | − | + | − | + |
| IIIw| + | − | + | − | + |

+ = switch closed

INVENTOR.
ROLF MAYER
BY Kenway, Jenney & Hildreth
ATTORNEYS

| PROGRAM STAGE | SWITCHES | | | | |
|---|---|---|---|---|---|
| | 11 | 12 | 13 | 14 | 6 |
| Ik | − | − | − | − | |
| IIk | − | − | − | + | |
| O | − | − | − | − | |
| Iw | − | + | − | − | + |
| IIw | − | − | + | + | + |
| IIIw | + | − | + | + | + |

+ = switch closed

INVENTOR.
ROLF MAYER

March 2, 1965 R. MAYER 3,171,950
ELECTRICAL ROOM HEATER-VENTILATOR CONTROL ARRANGEMENTS
Filed June 30, 1960 3 Sheets-Sheet 3
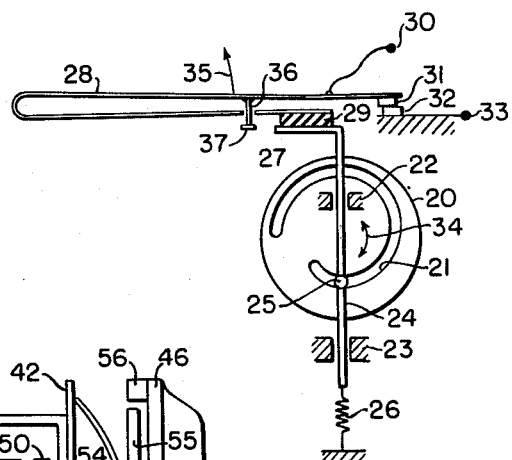
FIG. 3
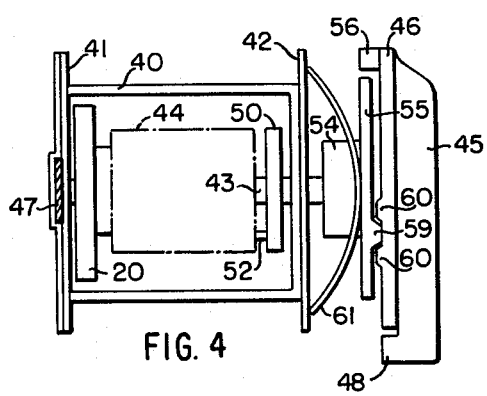
FIG. 4
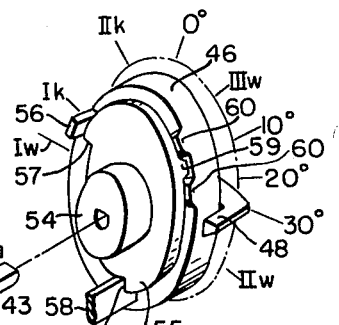
FIG. 5
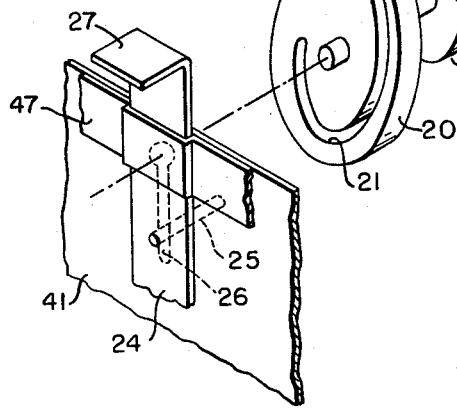
INVENTOR.
ROLF MAYER
BY
*Kenway, Jenney & Hildreth*
ATTORNEYS 3,171,950
ELECTRICAL ROOM HEATER-VENTILATOR
CONTROL ARRANGEMENTS
Rolf Mayer, Frankfurt am Main, Germany, assignor, by mesne assignments, to Braun Aktiengesellschaft, Frankfurt am Main, Germany
Filed June 30, 1960, Ser. No. 39,847
Claims priority, application Germany, July 2, 1959,
B 53,852
8 Claims. (Cl. 219—486)

The present invention concerns electrical heater-ventilators, but also has utility in connection with other electrical devices requiring individual adjustment and/or control of at least two different operational functions, each of which is to be controlled by means of a single actuating member, such as a switch.

In electrical heater-ventilators, the heat output should be adjustable in several stages between zero and a maximum value, and the flow rate of the blower should also be adjustable in order to control the heating or ventilating action. For this purpose, separate switches were previously used, which could be mechanically coupled. Recently there has been a tendency to use push-button switches for setting the various operational functions of such an apparatus, but these sets of push-buttons are wasteful, troublesome and costly, and take up a relatively large amount of space. It is also particularly important with heater-ventilators of small size to reduce the number of switches so that they will be as small and light as possible.

Space heater-ventilators for dwelling and office rooms are known in which the selection of the flow rate and the heat output are not independently selectable by the user, but are adjustable in a predetermined relationship to one another by control means, so that the output air flow is regulated in temperature. The control means may be so arranged that the output air flow may not be heated to the singeing temperature of its dust particles, or to a temperature at which the apparatus or parts of the air guide passage thereof become unnecessarily hot. It has also been proposed to provide a temperature limit switch to guard against blower failure, operable independently of the heat output and air flow control means.

It is the primary object of my invention to provide an improved electrical room heating and ventilating apparatus, of the kind having means for simultaneously controlling both the air flow rate of a blower and the heat output of heating elements in various selected heating stages.

It is another object of the invention to afford an improved room heating and ventilating apparatus in which a single control is adjustable to select various heating stages and also to adjust the thermostatically controlled temperature of a room heated or ventilated thereby.

It is still another object of the invention to afford an improved electrical room heating and ventiating apparatus affording a ventilating stage and a variety of heating stages, including at least one unregulated heating stage in which a thermostat serves only as a temperature limit switch and is unaffected by room temperature, and at least one other regulated heating stage in which the operation of the heater is thermostatically controlled by the room temperature.

It is still a further object of the invention to afford an electrical control switch capable of controlling different operational functions by means of a single actuating member.

Further objects and advantages will become apparent as the following description proceeds.

The apparatus of the invention employs a multi-stage switch of any desired construction, for example a packet switch to simultaneously control the blower motor speed and the energization of the heating elements in the heating stages. The control characteristic may be such that the temperature of air leaving the heating elements is maintained approximately constant in heating operation. Starting from a base position of the switch, the different ventilating stages are conveniently attained by movement in one direction and the various heating stages by movement of the switch in the other direction.

According to the invention, a temperature controller or thermostatic switch, which is adjustable as regards its response temperature, is mechanically coupled with the function selector switch and, at least in the heating stage of maximum heat output, is connected electrically both into the heating circuit and into the blower motor circuit. The heat output is consequently controlled in the heating stages by appropriate selective energization of the heating elements by the function selector switch; energization of the heating elements is also subject to control by the temperature controller. The air flow rate is simultaneously adjusted by the temperature controller. Thus, for example, the resistance of the motor circuit may be varied so that the air flow rate reverts to a minimum value when the heating elements are switched off, so that the heat which is supplied by the heating elements after these have been switched off, is discharged from the apparatus; at the same time, the sensing member of the temperature controller is constantly swept over by air at room temperature, so that its response characteristic remains as sensitive as possible. The concurrent reduction of the air output prevents any disagreeable cooling effect when the heat is switched off.

In apparatus with a coupled temperature controller in accordance with a further feature of the invention, the necessity for a separate temperature limit switch is obviated. The temperature controller, in stages in which it should not effect control such as the stage of maximum heat output, is blocked to a closed position by the function selector switch to such an extent that it can respond on exceeding the limit temperature, but not in a lower temperature range. This protects the apparatus from excessive heating on a breakdown which could result from external causes, for example by accidental covering of the induction aperture of the blower. In the remaining heating and ventilating stages, the response temperature of the controller is adjusted by the selector switch to maintain a desired room temperature.

Advantageously, the controller is switched in again, after its response as a limit switch, by turning the selector switch to the ventilating stage of maximum output. By these means, when the apparatus is switched on again after being turned off, the heat accumulated in the apparatus is quickly discharged. When the apparatus is switched on again in the heating stages, on the other hand, the controller may respond immediately. The stage of maximum ventilating output is conveniently disposed adjacent the "off" position of the switch in order to facilitate switching on again. The switching member of the controller can be adjusted by means of a cam disc on the axle of the packet switch or, in alternative constructions, by a cam on the actuating member, for example, the rotary knob of the switch.

According to a further feature of the invention, the response temperature of the temperature controller may be varied in a range lying below the limit temperature as desired, without additional actuating members, by means of the function selector switch. The temperature controller is mechanically connected with the selector switch, so that in the controlled heating stages, its response temperature is varied by movement of the switch handle between the stops corresponding to these stages. An advantageous switch element is thereby provided, in which a multi-stage switch is combined with a controller whose response value is adjustable by means of the handle of the switch through a predetermined range. This controllability is not confined to a single switch setting, but may be provided in two or more settings.

In accordance with another feature of the invention, the selector switch is sub-divided into individual contact switches. A drag member has a lost-motion connection with the switch, and is driven by the switching member when the latter is turned between different stop positions, to actuate a contact switch; while the thermostatic switch is permanently coupled with the switching member by a control cam. By these means, the response temperature of the thermostatic switch may be adjusted within individual regulated stages by manipulating the selector switch, without altering the electrical connections of the selector switch corresponding to that stage.

In the regulated stages, because of this dual function of the selector switch, the selected switch position is not recognizable in the usual manner by the positioning of its handle relative to a fixed mark; in accordance with a further development of the invention, a signal disc is provided on the handle, and is also formed as a drag member frictionally driven from the selector switch handle. By means of abutments on the switch casing, the juxtaposition of the signal disc and the handle is altered as the switch is turned to its opposite terminal positions, and indicates the limit conditions by means such as different colors. In this way it is possible to ascertain from which of two switch positions, such as those of maximum and medium heat output, the handle has been entered into a control range provided with a temperature scale and disposed between these positions.

A preferred embodiment of the invention will be described with reference to the accompanying drawings, in which:

FIG. 3 is a schematic illustration of an arrangement for controlling the temperature controller by means of the function selector switch;

FIG. 4 is a plan view of a roller switch with drag discs, and

FIG. 5 shows the constructional elements of this switch in perspective view.

Figure 1:
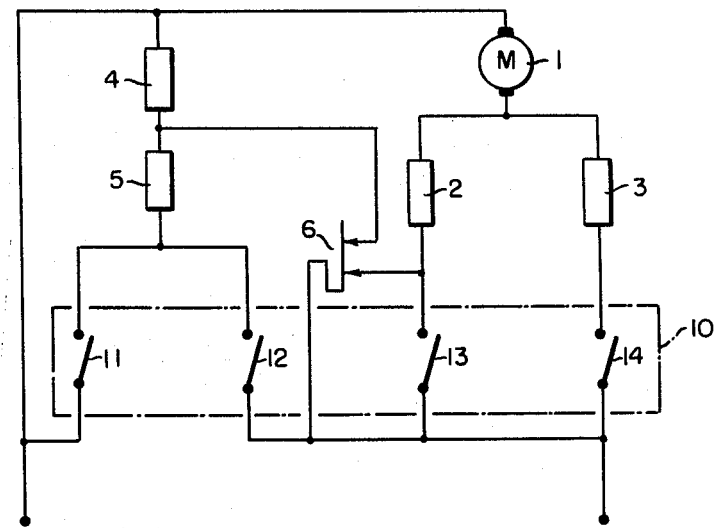
FIG. 1 is a circuit diagram of a heater-ventilator with two adjustable blower stages and three heating stages, of which two can be switched off by means of a temperature controller.
Figure 2:
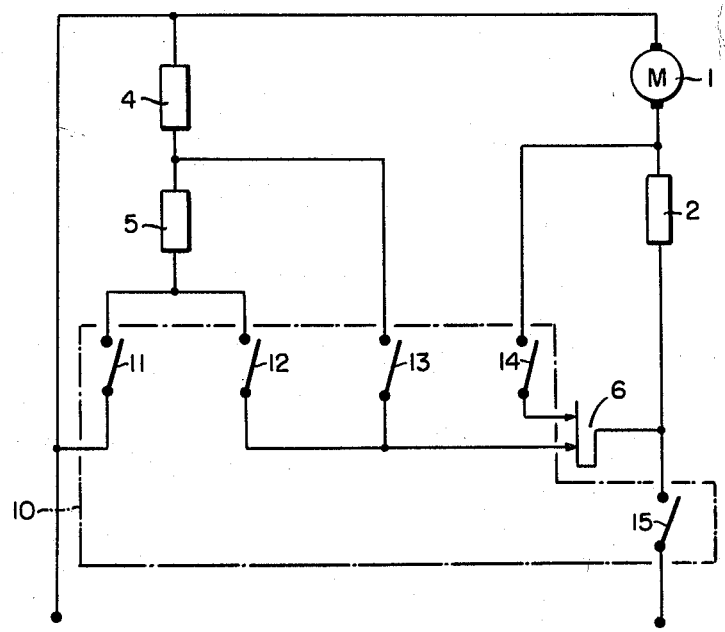
FIG. 2 shows another embodiment of the circuit in accordance with FIG. 1, with a controller effective in all heating stages as a temperature limit switch.

In FIGS. 1 and 2, the speed of the driving motor 1 of the blower is controlled by means of series resistances 2 and 3 of differing values. Two electrical heating resistances 4 and 5 can be switched in series, or individually, or in parallel, so that several heating stages can be selected. The operational functions are selected by a multi-stage switch 10 with single pole contact switches 11 to 14 or 15. The switching program is in each case shown in a diagram beneath the circuit diagram.

In the case of FIG. 1, the program has the stage O which designates the switched off position, the two ventilating stages I$k$, and II$k$ in which the heating is not switched on and the blower runs at a different speed, together with the three heating stages I$w$, II$w$, and III$w$ in which a heat output of, for example, 500, 1000 and 2000 watts is switched on. The blower output is controlled simultaneously with the heat output in such a way that the two larger heating outputs of 1000 and 2000 w. are utilized with greater flow rates of air. A temperature controller or thermo-switch 6 is interposed in the motor and heater circuit, and is disposed in the apparatus outside the heating passage. The controller is subjected to room temperature and responds to a predetermined temperature value by opening the contacts illustrated by the arrows. In the switch according to FIG. 1, the temperature controller contacts are closed only in the heating stages II$w$ and III$w$; in the heating stage I$w$, as well as in the two ventilating stages, they are restrained in the opened condition. The heating elements being initially switched on, the element 4 in the heating stage II$w$, or the elements 4 and 5 in the heating stage III$w$, are switched off completely by the thermo-switch 6 as soon as the desired room temperature has been attained. Simultaneously, the resistance is cut out of the motor circuit so that the series resistance disposed in the circuit is increased and the motor runs slower.

In the circuit according to FIG. 2, the thermo-switch 6 is included in the heating circuit in all three heating stages and is also included in the motor by way of the contact 14 in parallel with the series resistance 2. In order that the thermo-switch should not reduce the motor speed in the ventilating stages and thereby reduce the blower output—since the room temperature is in such cases in general very high—it is mechanically restrained to an open position in these stages, by means which will be described hereinafter. In all heating stages, on the contrary, the thermo-switch is closed, and opens to reduce the motor speed when it responds, and at the same time also switches off the heating elements. In this circuit the temperature controller acts simultaneously as a temperature limit switch; that is, on attaining an upper limiting temperature which is selected so as to provide the necessary safety for the apparatus, switches off the heating elements. With a bimetallic switch, the extent of bending of the bi-metallic strip which is necessary for this purpose can be selected such that the strip stops in its open position, so that the apparatus remains switched off. Reclosing of the contacts may be effected only by the switch knob, as when the apparatus is switched over to a ventilating stage.

Instead of completely switching off the heating elements on attainment of the predetermined room temperature, the switch can also be constructed in such a way that the temperature controller reduces the heat output to the next lower stage, or into the lowest heating stage; in the heating stage I$w$ this would then mean switching the heat off completely.

In FIG. 3 control of the temperature controller by a program switch is schematically illustrated. A control disc 20 fits on the axle of a packet switch; this disc 20 includes a control cam 21 in the form of a spiral groove. A slider 24 guided in bearings 22 and 23 runs in front of the control disc and engages with a pin 25 in the control cam 21. The slider is constantly pulled downwards by a spring 26 tensioned against the switch casing. With the rotation of the switch lever (not shown), in the directions of the double arrow 34, the slider is moved upwards or downwards. At its upper end the slider carries a hairpin shaped bent bimetallic strip 28 on a short crosshead 27; an insulating plate 29 is disposed between the crossheads 27 and the strip 28. The bimetallic strip is connected to a terminal 30 and supports a displaceable contact 31 which co-operates with a fixed contact 32 connected to a terminal 33. According to the position of the control disc 20 and the corresponding vertical position of the crosshead 27 of the slider 24, the bimetallic strip is more or less strongly pre-tensioned while the contacts 31 and 32 are in the closed position. When the temperature changes, which is necessary in order that the strip may bend further in the direction of the arrow 35, the contact 31 is finally raised from the counter-contact 32. If the disc 20 is rotated fully counter-clockwise, the strip is restrained open by the bias.

In order to block the bimetallic switch closed in certain stages of operation of the apparatus, a pin 36 is inserted in one of its limbs, passes through an aperture in the other limb, and carries a head 37 which is larger than the aperture diameter. If the disc 20 is rotated clockwise so far that the pin 25 is positioned on the greater radius of the spiral 21, the freedom of movement of the bimetallic strip is so limited by means of the pin 36 that the contact 31 can no longer open. It should be noted that in FIG. 3 the inclination of the control spiral 21 is exaggerated for the sake of clarity.

Another embodiment of the principle illustrated in FIG. 3 is shown in FIGS. 4 and 5 in a roller switch. The switch body 40 fits between two end plates 41 and 42. A switch-actuating roller 44, shown chain-dotted in FIG. 4, is received on a switch axle 43. The axle is mounted in the plates 41 and 42 and carries on its right-hand outwardly projecting end a switch knob 45 which has a disc-shaped base 46. A cranked guide plate 47 is attached to the end plate 41. The slider 24, as is clearly evident from FIG. 5, slides in the passage between the control path of the plate 47 and the plate 41; this slider has an end portion 27 bent over at right angles and constituting a crosshead carrying the bimetallic switch, as was explained in connection with FIG. 3. The pin 25 on the slider engages, through a longitudinal aperture 26 in the end plate 41, in the groove 21 of the control disc 20, which is disposed behind the plate 41 and drivingly connected with the switch roller 44. Rotation of the switch knob 45 displaces the slider 24, only over a portion of its range of rotary motion corresponding to the heating stages; the radius of the groove 21 remains constant toward its end corresponding to the cooling stages, in which the bimetallic thermostat switch is restrained open.

In FIG. 5 the individual constructional elements of the switch are shown separated from one another in the axial direction; the switch knob 45 is separated from the axle 43. The knob is marked on a scale 49 to indicate the various heating and ventilating stages, which are designated in FIG. 5 by the numerals 0, I$k$, II$k$, III$w$, II$w$, and I$w$, for greater clarity. The switch is shown positioned between stages II$w$ and III$w$. Between the heating stages II$w$ and III$w$ there is a temperature scale inscribed from 10° to 30° on which the response temperature of the bimetallic strip can be set. A selected room temperature of 30° is shown in the illustration. The switch contact 11, by means of which the heating elements are switched over between the stages II$w$ and III$w$, is controlled by a drag disc 50 which fits loosely on the axle 43 and is coupled with the switch roller 44 by means of a slot 51 receiving a pin 52 secured to the roller. The switch spring 11$a$ of the contact 11 has dropped into the indent 53, the contact is therefore closed, and the heating elements 4 and 5 are switched on; the apparatus thus operates in heating stage III$w$. The drag disc is retained by means of the force of the spring 11$a$ of the contact set. If another room temperature is chosen, for example, the knob 45 is set back from 30° to 10°, the switch roller 44 and the control disc 20 rotate in such a way that the pretensioning of the bimetallic strip varies, but the drag disc 50 remains stationary since the pin 52 slides along the slot 51. If, however, the knob is placed in the heating stage II$w$, then the pin 52 strikes against the end of the slot 51 and carries the drag disc with it; the contact spring is lifted out of the slot 53 and opens the contact 11. The heating element 5 is thus switched off. If the switch knob is then rotated back again out of the heating position II$w$ into the temperature scale (thus for example, back into the 30° position shown in FIG. 5) the contact 11 remains open. The contact 11 is not closed again until the knob is rotated into the temperature range lying on the opposite side stop position III$w$.

In order to afford an indication from which of the heating stage stop positions II$w$ or III$w$ the room temperature has been regulated by setting the knob to an intermediate point on the temperature scale, a signal disc 55 is disposed loosely on the lug 54 of the switch knob 45; the side of the disc which is turned away in FIG. 5 carries a colored marking which is visible through an aperture (not shown) in the knob 45 when the knob has been turned from the heating stage III$w$. A shoulder 62 which terminates a projection extending about substantially half the circumference of the disc 55 engages against an abutment 58 fixed to the casing, when the knob is in either of the positions II$w$ or III$w$. Moreover, a rib 59 on the signal disc 55 is sprung into a slot formed by two ribs 60 on the rear surface of the knob 45. A frictional connection is produced between the signal disc 55 and the switch knob by means of a saddle spring 61 (FIG. 4). If, therefore, the switch knob should be moved from the stop position III$w$ in the direction of the stop position II$w$, the base 46 moves the signal disc 55 with it, and the colored marking remains visible. If, however, the switch knob is moved into the stop position II$w$, the abutment 58 bears against the shoulder 62 of the signal disc, and forces the disc to rotate relative to the switch knob; the rib 59 is lifted out of the aforementioned slot between the ribs 60, and the colored marking disappears behind the aperture in the knob disc 46. A shoulder 57, at the opposite end of the projection forming the shoulder 62, produces a reverse relative rotation when the knob is switched back to the stop position III$w$. The illustrated procedure is repeated on each transition from the range of the temperature scale into one of the stop positions II$w$ or III$w$, wherein at the same time the heating elements are switched by the drag disc 50.

A projecting post 56 on the knob disc 46 limits rotary motion of this element in a clockwise direction, at stage I$k$; the post 56 also limits rotation of the knob in the counterclockwise direction at stage I$w$.

The principle of utilizing a multi-stage switch having discrete stop positions for actuation of a further element organically connected with it and continuously adjustable, has, over and above the present case, a further form of application in apparatus design, for example, in radio receiver technology. In a receiver, a wave-length range switch corresponds to the function or step selector switch, and continuous tuning within the selected wave range corresponds to the continuous temperature range within the individual stages. Moreover, a single knob operation can advantageously find application in measuring devices.

While preferred embodiments of the invention have been described by way of illustration, various changes and modifications will occur to those skilled in the art without departing from the true scope and spirit of the invention; I therefore intend to define the invention in the appended claims without limitation to the specific details of the illustrative embodiments.

I claim:

1. In an electrical room heating and ventilating apparatus, a blower, a motor drivingly connected with said blower, a plurality of heating elements, a multi-stage function selector switch manually adjustable to select at least one ventilating stage and a plurality of heating stages and being movable within at least one regulable heating stage without switching to a different stage, a thermo-static switch having adjustable temperature-responsive means for opening said thermostatic switch at a response temperature, such that said response temperature may be adjusted by applying a variable bias to said temperature-responsive means, said selector switch and said thermostatic switch being electrically connected with said motor and said heating elements for selectively energizing and controlling the speed of said motor and for selectively energizing said heating elements, biasing means drivingly connected with said selector switch and with said temperature-responsive means for variably biasing said thermostatic switch to adjust the response temperature thereof by manually adjusting said thermostatic switch within said one regulable heating stage without switching to a different stage, said biasing means being constructed and arranged to increase the bias on said thermostatic switch to a fixed maximum safe value of response temperature when said selector switch is adjusted to select another of said heating stages, said other heating stage being an unregulated stage.

2. Apparatus according to claim 1, in which said biasing means comprise cam means drivingly connecting said selector switch with said thermostatic switch for adjustment of said response temperature.

3. Apparatus according to claim 1, in which said motor and said heating element are connected for energization by said selector switch for reduced speed operation and for reduced heating output, respectively, upon opening of said thermostatic switch.

4. Apparatus according to claim 1, in which said thermostatic switch is provided with blocking means, and in which said selector switch is arranged to actuate said blocking means to reclose said thermostatic switch, after the latter has been opened upon said limiting temperature being exceeded in said unregulated stage, upon setting of said selector switch to said ventilating stage.

5. Apparatus according to claim 1, in which said function selector switch is subdivided and includes a plurality of switch contacts, said function selector switch including a switching element operable to a series of spaced-apart stop positions, and a drag member having a lost motion connection with said switching element and being arranged to be driven thereby to operate one of said switch contacts when said switching element is operated into a stop position, such that said switching element is movable intermediate stop positions to adjust the response temperature of said thermostatic switch within a selected heating stage.

6. Apparatus according to claim 5, together with a signal disc frictionally driven by said switching element, and a switch casing formed with catches, said signal disc being restrained by said catches to enter different limiting juxtapositions to said switching element upon passage of said switching element into limiting stop positions, together with means for visibly indicating the juxtapostion of said signal disc to said switching element.

7. In an electrical room heating and ventilating apparatus, a blower, a motor drivingly connected with said blower, a plurality of heating elements, a multi-stage function selector switch manually adjustable to select at least one ventilating stage and a plurality of heating stages and being movable within various regulable ones of said heating stages without switching to a different stage, a thermostatic switch having bimetallic temperature-responsive spring means for opening said thermostatic switch at a response temperature, such that said response temperature may be adjusted by applying a variable bias to said spring means, said selector switch and said thermostatic switch being electrically connected with said motor and said heating elements for energizing and selectively controlling the speed of said motor and for selectively energizing said heating elements, biasing means drivingly connected with said spring means and with said selector switch to variably bias said thermostatic switch to adjust the response temperature thereof by manually adjusting said thermostatic switch within said various regulable ones of said heating stages without switching to a different stage, said biasing means being constructed and arranged to increase the bias on said thermostatic switch to a fixed and invariable extent when said selector switch is adjusted to select another one of said heating stages, which is an unregulated stage, such that said thermostatic switch opens only when a fixed safe limit temperature is exceeded, said bias being decreased in said regulable ones of said stages such that said thermostatic switch opens at a selected response temperature to decrease the heat output.

8. Apparatus according to claim 7, in which said function selector switch is sub-divided and includes a plurality of switch contacts, said function selector switch including a switching element operable to a series of spaced-apart stop positions and having a lost-motion driving connection with said switch contacts such that switching between at least two adjacent heating stages is preceded by movement of said switching element through a range, whereby said thermostatic switch is adjustable in response temperature by movement of said switching element in said range within either selected one of said two adjacent stages.

References Cited in the file of this patent
UNITED STATES PATENTS

| | | |
|---|---|---|
| 1,913,681 | Otis | June 13, 1933 |
| 1,975,130 | Stewart | Oct. 2, 1934 |
| 2,114,512 | Weschcke | Apr. 19, 1938 |
| 2,474,048 | Greenlee | June 21, 1949 |
| 2,700,505 | Jackson | Jan. 25, 1955 |
| 2,788,416 | Hilbury | Apr. 9, 1957 |
| 3,004,709 | Hays | Oct. 17, 1961 |